United States Patent [19]

Nissley

[11] Patent Number: 5,660,217

[45] Date of Patent: Aug. 26, 1997

[54] STUMP GRINDER

[76] Inventor: Michael C. Nissley, Rte. 10, Box 135-19, Tallahassee, Fla. 32310

[21] Appl. No.: 668,909

[22] Filed: Jun. 24, 1996

[51] Int. Cl.$^6$ ................................................. A01G 23/06
[52] U.S. Cl. ........................ 144/24.12; 144/334; 37/302
[58] Field of Search ........................... 83/928; 37/302; 144/24.12, 334; 180/7.1, 9.4, 19.1

[56] References Cited

U.S. PATENT DOCUMENTS

| | | | |
|---|---|---|---|
| 3,868,980 | 3/1975 | Blum | 144/24.12 |
| 4,402,352 | 9/1983 | Hodges | 144/24.1 |
| 4,690,183 | 9/1987 | Eilertson | 144/24.1 |
| 4,703,786 | 11/1987 | Doskocil | 144/24.1 |
| 4,709,736 | 12/1987 | Bellars | 144/24.12 |
| 4,913,253 | 4/1990 | Bowling | 180/210 |
| 5,042,238 | 8/1991 | White, III et al. | 56/11.8 |
| 5,289,859 | 3/1994 | Minton, Jr. et al. | 144/24.12 |
| 5,360,041 | 11/1994 | Stevens | 144/24.1 |
| 5,419,380 | 5/1995 | Bot | 144/24.12 |

*Primary Examiner*—W. Donald Bray
*Attorney, Agent, or Firm*—Peter Loffler

[57] ABSTRACT

A stump grinder is comprised of a vehicle having a pair of opposing drive wheels and one or more pivot wheels. Each drive wheel has motor means independently operable of the other wheel's motor means giving the vehicle a zero turning radius capability. A tool bar, capable of vertical articulation only, has a grinding wheel attachment thereon. Grinding wheel power is achieved through appropriate linkage to the vehicle or can be achieved via independent motor means.

9 Claims, 3 Drawing Sheets

STUMP GRINDER

BACKGROUND OF THE INVENTION

1. Field of the Invention

The present invention relates to a mechanical device used to grind down tree stumps.

2. Background of the Prior Art

The challenge of clearing land, scheduled for various types of commercial use, has been around since time immortal. Many methods and devices have been proposed for removing the stumps from the earth's surface in order to allow soil tillage, building construction, etc. Such devices include machines capable of grinding the tree stumps down below the surface level or completely out of the ground. Exemplary of such devices is U.S. Pat. No. 4,074,447 to Slivers et al., which includes a rotary cutting wheel powered by a driving means such as a combustion engine. Although designed for relatively safe operation, this and other examples of stump grinders found in the art are, nevertheless, subject to operator misuse, resulting in death or serious injury to the operator. Typical of such misuse occurs when the operator ventures out in front or the device and is injured by the rotating cutting wheel. Alternately, a flying piece of debris can strike the operator as he stands behind or beside the device while to operating the device.

Other problems associated with current stump grinders is their lack of ability to be moved from one stump grinding job to another. Many stump grinders are relocated from one grinding job to another by hooking the device to a truck or other tow vehicle and the vehicle moves the stump grinder. This method of relocation is slow and inefficient in requiring the operator to leave the controls of the stump grinder, climb into the tow vehicle, and actually move the stump grinder. Thereafter, the operator disembarks the tow vehicle, decouples the stump grinder and restarts the grinding process. This routine is very slow and inefficient as many stump grinding jobs involve hundreds or even thousands of stumps. The routine is physically demanding on the operator, resulting in manpower inefficiency and is also very cumbersome, especially in tight grinding jobs wherein the stump grinder must be maneuvered around trees, fences, buildings, and other obstacles.

Other stump grinders are designed for the operator to stand beside the machine. This type of stump grinder has a hydraulic motor on one of its wheels in order to propel the grinder from one stump to the next while the operator walks alongside or behind the device during relocation. Such grinders are also relatively difficult to relocate between stumps and they suffer from limited horsepower, further limiting their utility.

The above-mentioned stump grinders have at least three hydraulic cylinders, two pivot points and an extension arm in order to give the cutting wheel the ability to articulate up and down, laterally back and forth, and in and out. The result is that the stump grinders have at least 8 wear points, one at each end of the hydraulic cylinders, and one at each pivot point. The constant movement of these components along their various axis of articulation creates excessive wear of the components resulting in inefficient device performance and, potentially, danger to the operator resulting from device failure.

Therefore, there is a need in the art for a stump grinder that overcomes the problems associated with the current stump grinder devices. Such a stump grinder must have the capability to be quickly and efficiently relocated from one grinding job to another without undue physical demand on the operator. Relocation in tight stump grinding jobs must also be efficient. The device must provide maximum operator safety during operation. The device must have sufficient power to adequately perform on the largest grinding jobs. Such a device must have a design that reduces the number of wear points resulting in enhanced device reliability.

SUMMARY OF THE INVENTION

The stump grinder of the present invention addresses the aforementioned needs in the art by providing a stump grinder that is safe and efficient in operation and that maximizes operator safety.

Specifically, the stump grinder is comprised of a self-propelled vehicle having an operator seat and a pair of drive wheels opposite one another, with each wheel equipped with a hydraulic motor that is operable independent of the other. One or more pivot wheels, advantageously in the rear of the vehicle, are also attached to the vehicle. Each hydraulic motor is instantly reversible giving the vehicle the ability for fluid turning movement and the ability to have a zero turning radius.

A frame member extends outwardly from the vehicle. The frame is capable of vertical articulation only. A grinding wheel is rotatably attached to the end of the frame and has a safety shroud covering located thereover. The grinding wheel is designed so that the upper circumference rotates away from the operator and can be powered by the vehicle via gear or belt linkage. Alternately, the grinding wheel can have its own independent power source located proximate thereto.

In order to utilize the stump grinder, the operator positions himself within the seat and drives the device to the subject stump. Thereafter, the operator lowers the grinding wheel until the shroud covering is positioned just above the stump. The operator then drives the grinding wheel into the stump until the grinding wheel engages the stump. The operator then reverses direction of one of the drive wheels relative to the other in order to twist the vehicle resulting in the grinding wheel traversing through the top of the stump. The operator then reverses both drive wheels in order to twist the vehicle in reverse direction, all the time keeping forward pressure on the grinding wheel, in order to grind the stump down. The operator continues the back and forth vehicle twisting with forward pressure on the grinding wheel until the stump is eradicated.

The device gives improved stump grinding capability. The zero turning radius of the vehicle allows the vehicle itself to articulate the grinding wheel with respect to the stump. This eliminates the need for the multi-axis articulation of the tool bar, reducing component wear and increasing device efficiency. In relocating the device from one job to the next, the fluid and precise maneuverability of the vehicle as a result of the zero turning radius capability, allows the device to quickly maneuver to the next grinding job. Tight areas having trees, fences, buildings, etc., are no problem for device relocation. As the device operator remains on the device, relocation is very quick and efficient. As the operator is not required to leave the vehicle seat at any time, the potential for injury is greatly reduced.

DETAILED DESCRIPTION OF THE PREFERRED EMBODIMENT

Figure 1:
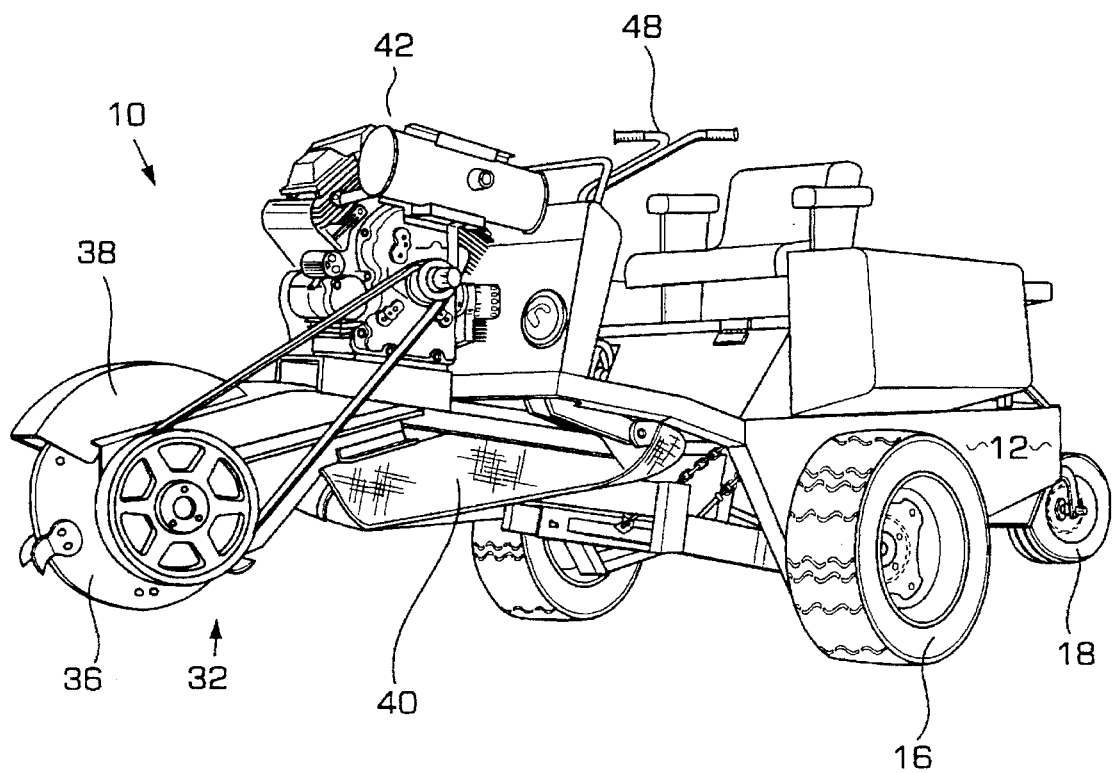
FIG. 1 is an isometric view of the stump grinder of the present invention
Figure 2:
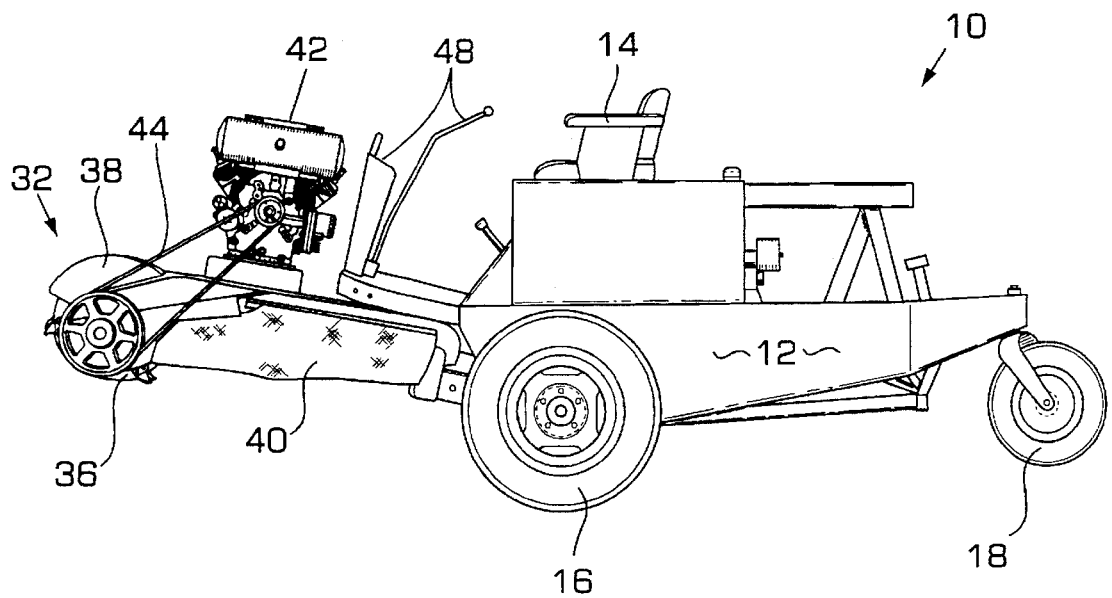
FIG. 2 is side view of the stump grinder.
Figure 3:
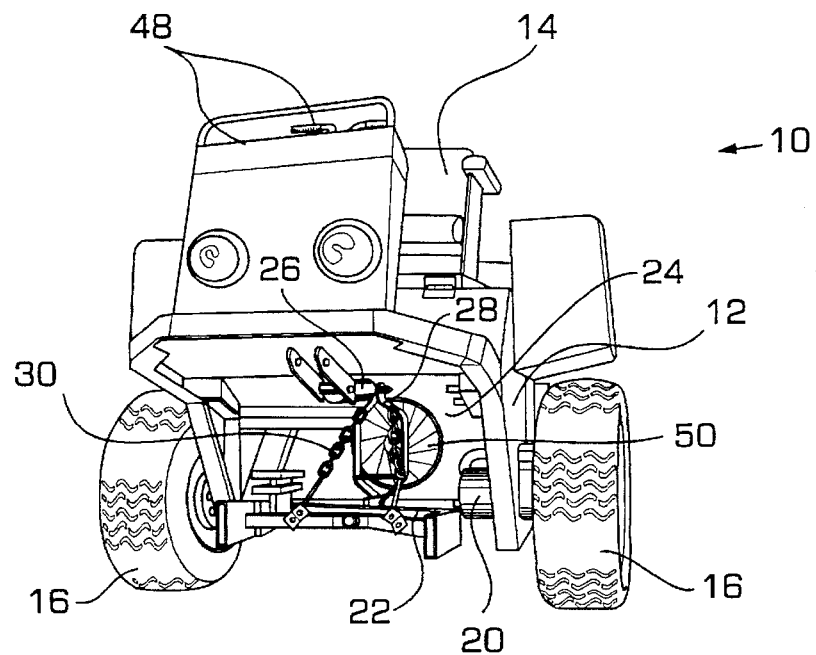
FIG. 3 is a front view of the vehicle with the grinding assembly removed.

Referring now to the drawings, it is seen that the stump grinder of the present invention, generally denoted by reference numeral 10, is comprised of a multi-wheeled vehicle 12 having a seat 14 thereon. The vehicle 12 has a pair of front drive wheels 16 and one or more rear pivot wheels 18. Each of the front drive wheels 16 has power means 20 such as a hydraulic motor providing locomotive power to its respective drive wheel 16. Each of the power means 20 is independently operable of the other power means 20 and each is instantly reversible. This gives the vehicle 12 a zero turning radius capability.

A standard tool bar 22 attaches to the frame 24 of the vehicle 12. The tool bar 22 is equipped with a hydraulic cylinder 26, attached to an articulation arm 28 which in turn attaches to a chain 30 with the ends of the chain 30 attached to the tool bar 22 giving the tool bar 22 vertical articulation capacity. A stump grinding assembly 32 attaches to the end of the tool bar 22. The stump grinding assembly 32 is comprised of a frame 34, attachable to the tool bar 22 and a grinding wheel 36, rotatably mounted to the frame 34. A safety shroud covering 38 covers the upper portion of the grinding wheel 36. The grinding wheel 36 is designed so that its upper circumference rotates away from the vehicle 12 and thus away from the operator so that any loose debris is thrust outwardly away from the operator. A deflection plate 40 is attached to the frame 34 for further operator protection.

It is expressly recognized that other attachments such as rotors, tillers, etc., can be attached to the tool bar 22. It is also expressly recognized that other methods of achieving vertical grinding assembly articulation can be utilized within the scope and spirit of the present invention.

Figure 4:
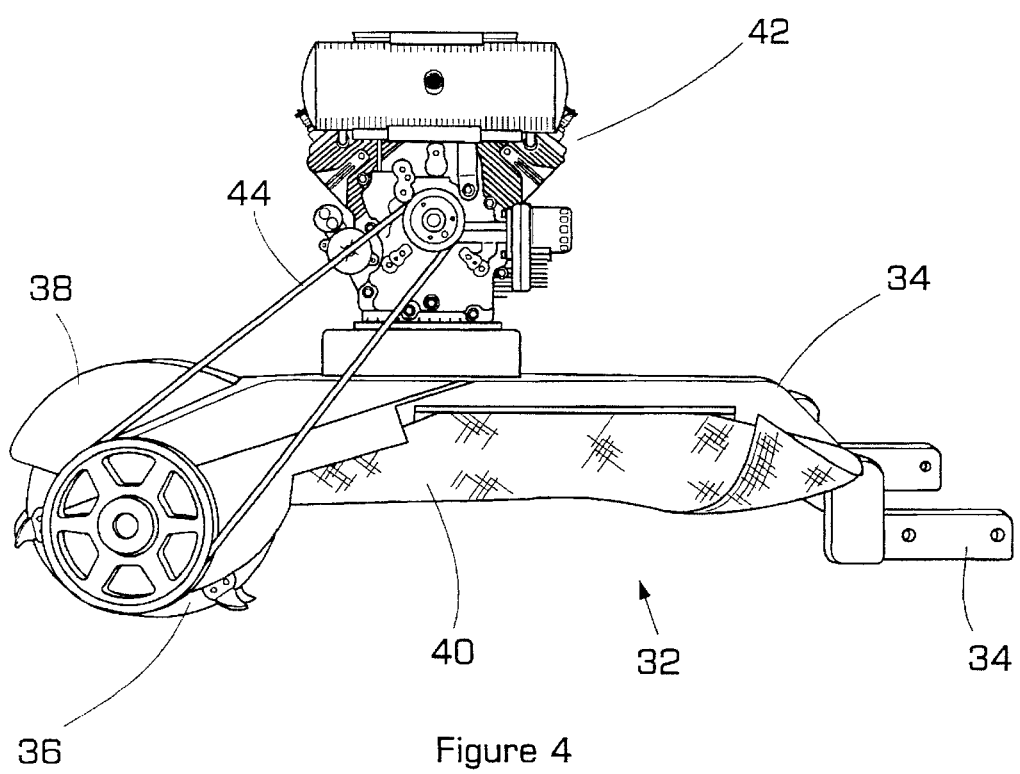
FIG. 4 is a side view of the grinding assembly. Similar reference numerals refer to similar parts throughout the several views of the drawings.

Grinding wheel 36 power can be achieved through the vehicle 12 itself. Appropriate gear linkage or appropriate belt linkage (neither illustrated) would transfer power from the vehicle's clutch 50 to the grinding wheel 36. Alternately, a separate power source, such as a combustion engine 42 as seen in FIG. 4, can provide grinding wheel 36 power, via appropriate belt linkage 44 or via a gear linkage (not illustrated).

In order to utilize the stump grinder 10, the operator positions himself within the seat 14 and drives the device 12 to the subject stump. Thereafter, the operator lowers the grinding wheel 36 until the shroud covering 38 is positioned just above the stump. The operator then drives the grinding wheel 36 into the stump until the grinding wheel 36 engages the stump. The operator then reverses direction of one of the drive wheels 16 relative to the other in order to twist the vehicle 12 resulting in the grinding wheel 12 traversing through the top of the stump. The operator then reverses both drive wheels 16 in order to twist the vehicle 12 in reverse direction, all the time keeping forward pressure on the grinding wheel 36, in order to grind the stump down. The operator continues the back and forth vehicle 12 twisting with forward pressure on the grinding wheel 36 until the stump is eradicated.

Entire device operation, including vehicle power and maneuverability, tool bar articulation, and grinding wheel rotation are all achieved from the safety of the seat 14 whereat device controls 48 are advantageously locatable.

While the invention has been particularly shown and described with reference to an embodiment thereof, it will be appreciated by those skilled in the art that various changes in form and detail may be made without departing from the spirit and scope of the invention.

I claim:

1. A stump grinder comprising:

a vehicle having a zero turning radius capability;

power means for providing locomotion for the vehicle;

a tool bar attached to the vehicle;

means for providing vertical articulation of the tool bar;

a grind wheel assembly having a grind wheel rotatably attached thereto, attached to the tool bar; and drive means for providing rotational articulation of the grind wheel.

2. The device as in claim 1 wherein the means for providing vertical articulation of the tool bar comprises:

a hydraulic cylinder, having a first end attached to the vehicle and a second end;

an articulation arm having a first end attached to the second end of the hydraulic cylinder and a second end;

a chain having a plurality of portions with one portion attached to the second end of the articulation arm and one or more of the portions attached to the tool bar.

3. The device as in claim 1 further comprising a shroud attached to the grind wheel assembly substantially covering the upperside of the grind wheel such that the underside of the grind wheel is exposed.

4. The device as in claim 1 further comprising a deflection plate attached to the grind wheel assembly.

5. The device as in claim 1 further comprising;

a seat attached to the vehicle;

control means for controlling the stump grind, located on the vehicle proximate to the seat.

6. The device as in claim 1 wherein the drive means for providing rotational articulation of the grind wheel comprises:

an engine;

a belt linkage, linking the engine to the grind wheel.

7. The device as in claim 1 wherein the drive means for providing rotational articulation of the grind wheel comprises:

an engine;

a gear linkage, linking the engine to the grind wheel.

8. The device as in claim 1 wherein the drive means for providing rotational articulation of the grind wheel comprises a belt linkage, linking the power means to the grind wheel.

9. The device as in claim 1 wherein the drive means for providing rotational articulation of the grind wheel comprises a gear linkage, linking the power means to the grind wheel.

* * * * *